United States Patent
de Souza et al.

(10) Patent No.: US 6,722,823 B1
(45) Date of Patent: Apr. 20, 2004

(54) MILLING CUTTER

(75) Inventors: Ruy Frota de Souza, Latrobe, PA (US); Scott W. Lebo, Wilpen, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/328,864

(22) Filed: Dec. 24, 2002

(51) Int. Cl.[7] ............................................... B23C 5/02
(52) U.S. Cl. ............................ 407/40; 407/53; 407/113
(58) Field of Search ........................... 407/40, 35, 34, 407/42, 53, 113, 114, 115, 116

(56) References Cited

U.S. PATENT DOCUMENTS

| | | |
|---|---|---|
| 2,186,417 A | 1/1940 | Kraus |
| 3,434,190 A | 3/1969 | Kaiser |
| 3,694,876 A * | 10/1972 | Erkfritz ........................ 407/48 |
| 3,762,005 A * | 10/1973 | Erkfritz ........................ 407/113 |
| 4,531,864 A | 7/1985 | Bylund |
| 4,551,048 A | 11/1985 | Phillips et al. |
| 4,597,695 A | 7/1986 | Johnson |
| 5,209,611 A | 5/1993 | Drescher |
| 5,639,189 A | 6/1997 | Hoefler |
| 5,820,308 A * | 10/1998 | Hoefler ........................ 407/40 |
| 5,868,529 A | 2/1999 | Rothballer et al. |

FOREIGN PATENT DOCUMENTS

| | | |
|---|---|---|
| DE | 876 940 | 9/1952 |
| DE | 876940 | 5/1953 |
| EP | 0 104517 A2 | 4/1984 |
| JP | 61-38812 A | 2/1986 |
| JP | 59162138 | 2/1986 |
| JP | 61-86116 A | 5/1986 |
| JP | 59204720 | 5/1986 |

OTHER PUBLICATIONS

Photographs of Cam Lobe Milling Cutter With Inserts manufactured by Belcar Products prior to Dec., 2002 (3 pgs.).

* cited by examiner

Primary Examiner—Willmon Fridie, Jr.
(74) Attorney, Agent, or Firm—Larry R. Meenan

(57) ABSTRACT

A milling cutter having a plurality of on-edge cutting inserts mounted within pockets about the peripheral wall of the cutter body includes angled pockets which not only permit a greater number of pockets to accept inserts but furthermore permits relatively easy access to insert and remove mounting screws for securing each insert within a pocket.

28 Claims, 2 Drawing Sheets

MILLING CUTTER

BACKGROUND OF THE INVENTION

1. Field of the Invention

This invention relates to milling cutters and, more specifically, to a plunge milling cutter having angled pockets with a chip clearance groove to permit a greater number of inserts to be mounted within the cutter.

2. Description of Related Art

A goal of most metalworking operations is to perform a given machining task in the least amount of time and in a manner that will not result in premature tool failure. In particular, in a milling operation, it is well-known that the cutting forces upon, and the tool wear of, individual inserts within a milling cutter will be diminished if the cutting load is evenly distributed among many inserts in the milling cutter. However, in the past, milling cutter body designs have limited the maximum number of cutting inserts to be placed in the body. Utilizing a cutter with the maximum number of inserts is especially important for the machining of cam lobes on cam shafts of internal combustion engines.

U.S. Pat. No. 5,820,308 is directed to a milling cutter having a plurality of on-edge inserts mounted about the periphery of the cutter. The orientation of these on-edge inserts limits the number of inserts that will fit within the cutter body.

An object of this invention is to provide a plunge milling cutter having a greater number of cutting inserts about its periphery to minimize the force and to maximize the tool life of each insert in the milling cutter while at the same time providing effective chip clearance.

SUMMARY OF THE INVENTION

The present invention is directed to a plunge milling cutter comprising a cutter body rotatable about a central axis, a peripheral wall on the cutter body, and insert pockets located in the peripheral wall. Each pocket is spaced from an adjacent pocket by a lug and each pocket has support surfaces including a bottom surface adapted for positioning a rectangular insert within a predefined rectangular envelope within the pocket. Each rectangular envelope has a front and back and four sides therebetween, including a top side, a bottom side and a radially inward side. Each lug has a radial width, a front face extending upwardly from the pocket bottom to the top of the lug, an axial face extending downwardly from the top of the lug to a height below the top of the lug; and a rear face extending from the axial face downwardly to the bottom surface of an adjacent pocket. The support surfaces of the pocket are defined by the lug front face, the bottom surface, the lug rear face of an adjacent lug, and a pocket wall positioned radially inwardly from the peripheral wall and connecting adjacent lugs. The lug axial face is sloped downwardly across the entire lug width from the top of the lug to the lug rear face, thereby providing a chip clearance groove across the entire width of the lug. Furthermore, the lug front face extends over the entire back of the insert envelope.

The invention is further directed to a plunge milling cutter assembly comprising a milling cutter as described above and including inserts within each pocket of the milling cutter.

DETAILED DESCRIPTION OF THE INVENTION

Figure 1:
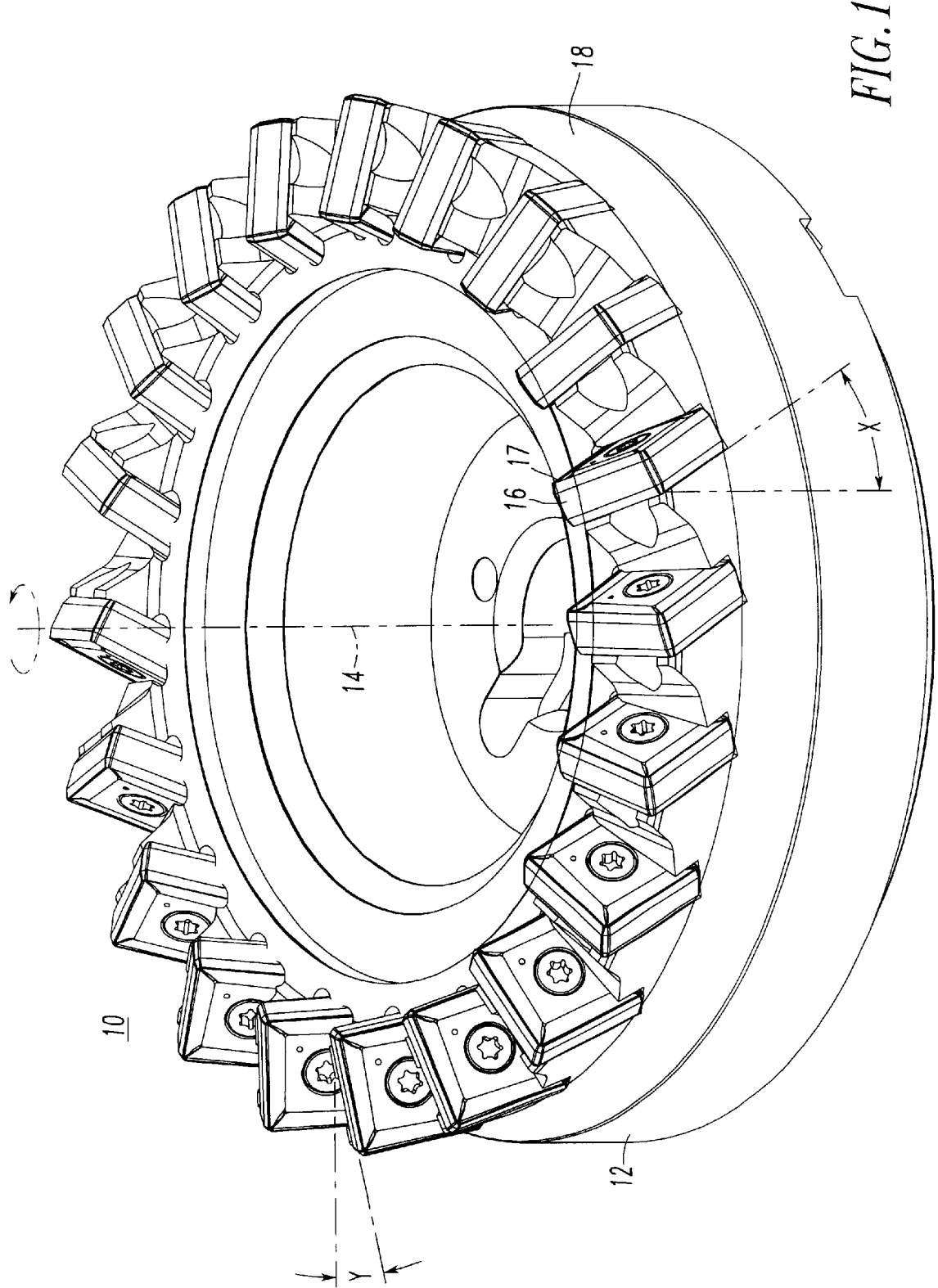
FIG. 1 illustrates a perspective view of a milling cutter in accordance with the subject invention.

FIG. 1 illustrates a milling cutter 10 having a cutter body 12 rotatable about a central axis 14. A plurality of cutting inserts 16 may be mounted about the peripheral wall 18 within pockets 20 (FIG. 2) therein. The cutting inserts 16 are identified as lay-down inserts.

A lay-down cutting insert is one where the cutting face of the insert is located on the largest seating surface of the insert. On the other hand, an on-edge cutting insert is one where the cutting face of the insert is located on a side of the insert perpendicular to the largest seating surface for the insert. A milling cutter with lay-down inserts, not on-edge inserts, is the subject matter of the present application. Using lay-down cutting inserts, the inventors have discovered a design that permits more inserts to be installed in the milling cutter than if they were to use on-edge cutting inserts.

The milling cutter 10 may be used for plunge milling operations and, more particularly, may be used for the machining of cam lobes on cam shafts used for automotive equipment.

Reference will be made to top and bottom with respect to the elements of FIG. 2, however it should be understood that these terms are used only to describe the relative location of these elements.

For clarity reference will also be made to a single pocket 20 and a single lug 25 with the understanding that each pocket and lug is identical to other pockets and lugs in the cutter body 12. However, separate reference will be made to adjacent pockets 20A, 20B and adjacent lugs 25A, 25B to better describe pocket 20 and lug 25.

Figure 2:
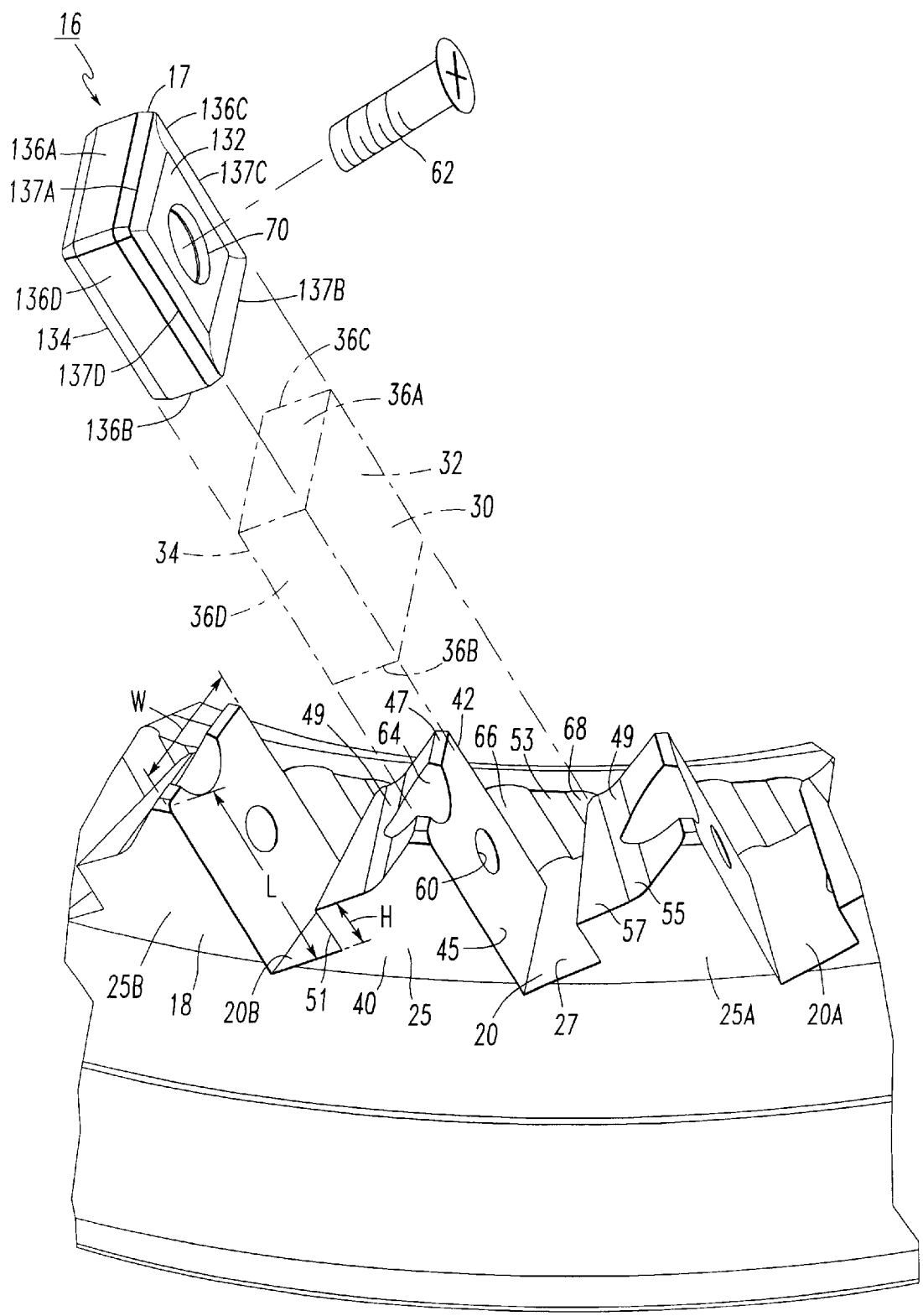
FIG. 2 illustrates an enlarged view from a slightly different perspective view of a portion of the cutter in FIG. 1, however, with a cutting insert retracted from a pocket and a phantom insert envelope introduced for illustrative purposes.

Directing attention to FIG. 2, insert pocket 20 is spaced from an adjacent pocket 20B by a lug 25 and is defined, in large part, by two lugs 25, 25A.

Each pocket 20 has support surfaces including a bottom surface 27. Furthermore, the pocket 20 is adapted for positioning a rectangular insert 16 conforming to a predefined rectangular envelope 30 in the pocket 20. Although the insert envelope 30 is actually located within the pocket 20, for clarity in illustration, the envelope 30 has been extracted as shown in FIG. 2.

The rectangular envelope 30 has a front 32, a back 34, and four sides including a top side 36A, a bottom side 36B, a radially inward side 36C, and a radially outward side 36D. Additionally the cutting insert 16 has a front 132, a back 134, and four sides including a top side 136A, a bottom side 136B, a radially inward side 136C, and a radially outward side 136D. At the intersection of the front 132 and each of the sides 136A, 136B, 136C and 136D of the insert 16 there are cutting edges 137A, 137B, 137C and 137D respectively. However, it is possible for certain insert designs to include only cutting edges 137A and 137B.

Each lug 25 has a radially outward surface 40 and a radially inward surface 42 defining therebetween a radial width W which for clarity is shown on an adjacent lug 25B. Each lug 25 furthermore has a front face 45 extending upwardly from the pocket bottom 27 to the top 47 of the lug 25. Each lug 25 furthermore has an axial face 49 extending downwardly from the top 47 of the lug 25 to a height H (See lug 25B) which is less than the height L of the lug. Each lug 25 furthermore has a rear face 51 extending downwardly from the axial face 49 of an adjacent lug 25A to the bottom surface 27 of pocket 20.

The support surfaces of pocket 20 are defined by the lug front face 45, the pocket bottom surface 27, the lug rear face 51 of lug 25A, and a pocket wall 53 positioned radially inwardly from the peripheral wall 18 whereby the pocket wall 53 connects adjacent lugs 25, 25A. The lug axial face 49 is sloped downwardly across the entire lug width W from the top 47 of the lug 25 to the lug rear face 51. By doing so, a chip clearance groove 55 is provided across the entire width W of the lug 25.

To provide maximum support to the cutting insert 16 within the pocket 20, the lug front face 45 extends over the entire back side 134 of the insert 16.

To maximize the size of the clearance groove 55, the lug rear face 51 preferably extends from the bottom surface 27 to a distance H which is no higher than half way up the side of the insert 16, when the insert is mounted within the pocket 20. To further enhance the chip clearance groove 55, the lug axial face 49 has a planar portion 57 which may be generally perpendicular to the lug front face 45.

Each lug front face 45 has a bore 60 therethrough to accept a mounting screw 62 that is designed to extend within a mounting bore 70 through the cutting insert 16 and to secure the insert 16 within the pocket 20. Furthermore, each pocket 20 is angled about the central axis 14 (FIG. 1) by an axial rake angle X which may be between 20–30° and preferably is 25° to permit multiple inserts 16 to be mounted in the cutter body 12 and furthermore to provide access for inserting and removing the mounting screw 62. Each lug 25 furthermore has an access groove 64 (FIG. 2) within the lug front face 45 and the lug axial face 49 to permit greater access to the mounting screw 62 secured within the lug front face 45. Although the access groove 64 is illustrated as curved, this is only a matter of convenience.

The lug rear face 51, as previously mentioned, extends upwardly from the bottom surface 27. This not only determines the size of the chip clearance groove 55 but furthermore, in conjunction with the bottom surface 27, protects the bottom edge 136B of the cutting insert 16 that is mounted within the pocket 20.

To protect the side cutting edge 137C of a cutting insert 16, the pocket wall 53 may further include at least one recessed groove 66 parallel to the lug front face 45. It is entirely possible that the cutting insert 16 has a cutting edge on side 136C but opposite cutting edge 137C. Under the circumstances, a second recessed groove 68 may exist such that, together, recessed grooves 66, 68 protect the cutting edge 137C and a cutting edge on the opposite side of 136C. These recesses 66, 68 also provide relief for the cutting edges positioned within the recesses 66, 68.

It should be noted that the pocket wall 53 extends only partially to the top 47 of the lug 25. In one embodiment the pocket wall 53 extends no more than 0.350 inches from the top 27 of the lug 25. The purpose of this shortened height is to provide clearance during a cam lobe milling operations such that the cutter body 12 does not interfere with adjacent lobes on a cam shaft that are not currently being machined by the cutter 10. In one embodiment, the pocket wall 53 may extend upwardly to a point which is a distance of at least 0.350 inch from the top 47 of the lug 25.

From inspection of FIG. 1, one corner 17 of each of the inserts 16 is protruding and foremost in the cutter body 12 such that during a plunge milling operation this corner will be the first to engage a workpiece. The bottom surface 27 of the pocket 20 is oriented to position the rectangular insert 16 such that this corner 17 of the insert 16 protrudes beyond the cutter body 12. In particular, the pocket bottom surface 27 is angled to provide a bevel angle Y of between 10–20° and preferably 15°.

Finally, the lug front face 45 may be oriented at a radial rake angle relative to a radial line extending from the central axis 14 to form an angle of between 5–15° and is preferably 10°. Radial rake angles are well known by those skilled in the art of metalworking and for that reason the radial rake angle is not illustrated in FIG. 1.

It should be appreciated that the insert 16 suitable for the pockets 20 discussed herein has been described as rectangular and it is entirely possible that such a rectangle may be a square.

While the subject invention so far has been directed to a milling cutter 10 having a body 12 with reference to a cutting insert 16 mounted within a pocket 20, it should be appreciated that he invention may be directed to the milling cutter body 12 alone without cutting inserts 16 mounted therein. However, under these circumstances, the insert envelope 30, which is a predetermined shape based upon an insert for which the cutter body 12 was designed, will define the shape of the pocket 20.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A plunge milling cutter comprising:
   a) a cutter body rotatable about a central axis;
   b) a peripheral wall on the cutter body;
   c) insert pockets located in the peripheral wall, wherein each pocket is spaced from an adjacent pocket by a lug and wherein each pocket has support surfaces including a bottom surface adapted for positioning a rectangular insert within a predefined rectangular envelope within the pocket;
   d) wherein each rectangular envelope has a front and back and four sides therebetween, including a top side, a bottom side and a radially inward side;
   e) wherein each lug has:
      1) a radial width;
      2) a front face extending upwardly from the pocket bottom to the top of the lug;
      3) an axial face extending downwardly from the top of the lug to a height below the top of the lug; and
      4) a rear face extending from the axial face downwardly to the bottom surface of an adjacent pocket,
   f) wherein the support surfaces of the pocket are defined by the lug front face, the bottom surface, the lug rear face of an adjacent lug, and a pocket wall positioned radially inwardly from the peripheral wall and connecting adjacent lugs;
   g) wherein the lug axial face is sloped downwardly across the entire lug width from the top of the lug to the lug rear face, thereby providing a chip clearance groove across the entire width of the lug; and
   h) wherein the lug front face extends over the entire back of the insert envelope.

2. The plunge milling cutter according to claim 1, wherein the lug rear face extends from the bottom surface to a distance only as high as the lower half of the insert envelope.

3. The plunge milling cutter according to claim 1, wherein the lug axial face has a planar portion perpendicular to the lug front face to enlarge the chip clearance groove.

4. The plunge milling cutter according to claim 1, wherein each lug front face has a bore therethrough to accept a mounting screw that extends through a cutting insert and secures the insert within the pocket and wherein each pocket is angled about the central axis toward an adjacent lug to permit multiple inserts to be mounted in the cutter and to provide access for inserting and removing the mounting screw.

5. The plunge milling cutter according to claim 4, wherein each lug has an access groove within the lug front face and the lug axial face to permit greater access to a mounting screw secured within the lug front face.

6. The plunge milling cutter according to claim 1, wherein the lug rear face extends upwardly from the bottom surface to protect the bottom edge of a cutting insert that is able to be mounted within the pocket.

7. The plunge milling cutter according to claim 1, wherein the pocket wall further includes at least one recessed groove parallel to the lug front face to provide relief and to protect a radially inward cutting edge of an insert that is able to be mounted within the pocket.

8. The plunge milling cutter according to claim 1, wherein the pocket wall extends only partially to the top of the lug to provide clearance for cam lobe milling operations when inserts are mounted within the cutter pockets.

9. The plunge milling cutter according to claim 8, wherein the pocket wall extends no more than a distance of at 0.350 inch from the top of the lug.

10. The plunge milling cutter according to claim 1, wherein the bottom surface is oriented to position a rectangular insert such that one corner of the insert would protrude beyond the cutter body.

11. The plunge milling cutter according to claim 1, wherein the axial rake angle is between 20 and 30°.

12. The plunge milling cutter according to claim 1, wherein the bevel angle is between 10 and 20°.

13. The plunge milling cutter according to claim 1, wherein the radial rake angle is between 5 and 15°.

14. The plunge milling cutter according to claim 1, wherein the rectangular envelope is suited to accommodate a square insert.

15. A plunge milling cutter comprising:
   a) a cutter body rotatable about a central axis;
   b) a peripheral wall on the cutter body;
   c) insert pockets located in the peripheral wall, wherein each pocket is spaced from an adjacent pocket by a lug and wherein each pocket has support surfaces including a bottom surface adapted for positioning a rectangular insert within the pocket;
   d) a cutting insert positioned within each pocket and having a rectangular shape with a front and back and four sides therebetween, including a top side, a bottom side and a radially inward side;
   e) wherein each lug has:
      1) a radial width;
      2) a front face extending upwardly from the pocket bottom to the top of the lug;
      3) an axial face extending downwardly from the top of the lug to a height below the top of the lug; and
      4) a rear face extending from the axial face downwardly to the bottom surface of an adjacent pocket,
   f) wherein the support surfaces of the pocket are defined by the lug front face, the bottom surface, the lug rear face of an adjacent lug, and a pocket wall positioned radially inwardly from the peripheral wall and connecting adjacent lugs;
   g) wherein the lug axial face is sloped downwardly across the entire lug width from the top of the lug to the lug rear face, thereby providing a chip clearance groove across the entire width of the lug; and
   h) wherein the lug front face extends over the entire back of the insert.

16. The plunge milling cutter according to claim 15, wherein the lug rear face extends from the bottom surface to a distance only as high as the lower half of the insert.

17. The plunge milling cutter according to claim 15, wherein the lug axial face has a planar portion perpendicular to the lug front face to enlarge the chip clearance groove.

18. The plunge milling cutter according to claim 15, wherein each insert is secured within a pocket by a mounting screw extending through the insert into the lug front face and wherein each pocket is angled about the central axis toward an adjacent lug to permit multiple inserts to be mounted in the cutter and to provide access for inserting and removing the mounting screw.

19. The plunge milling cutter according to claim 18, wherein each lug has an access groove within the lug front face and the lug axial face to permit greater access to a mounting screw securing the insert.

20. The plunge milling cutter according to claim 15, wherein the lug rear face extends upwardly from the bottom surface to protect the radially inward cutting edge of the bottom side of the cutting insert adjacent when the insert is mounted within the pocket.

21. The plunge milling cutter according to claim 15, wherein the pocket wall further includes at least one recessed groove parallel to the lug front face to provide relief and to protect the radially inward edge of the insert.

22. The plunge milling cutter according to claim 15, wherein the pocket wall extends only partially to the top of the lug to provide clearance for cam lobe milling operations.

23. The plunge milling cutter according to claim 22, wherein the pocket wall extends no more than a distance of 0.350 inch from the top of the lug.

24. The plunge milling cutter according to claim 15, wherein the bottom surface is oriented to position the insert such that one corner protrudes beyond the cutter body.

25. The plunge milling cutter according to claim 15, wherein the cutting insert is square.

26. The plunge milling cutter according to claim 15, wherein the axial rake angle is between 20 and 30°.

27. The plunge milling cutter according to claim 15, wherein the bevel angle is between 10 and 20°.

28. The plunge milling cutter according to claim 15, wherein the radial rake angle is between 5 and 15°.

* * * * *